United States Patent
Lai

(10) Patent No.: US 7,687,183 B2
(45) Date of Patent: Mar. 30, 2010

(54) ELECTROCHEMICAL FUEL CELL ELEMENTS HAVING IMPROVED COMPRESSION OVER CHANNELS

(75) Inventor: Yeh-Hung Lai, Webster, NY (US)

(73) Assignee: GM Global Technology Operations, Inc.

(*) Notice: Subject to any disclaimer, the term of this patent is extended or adjusted under 35 U.S.C. 154(b) by 1617 days.

(21) Appl. No.: 10/926,178

(22) Filed: Aug. 25, 2004

(65) Prior Publication Data

US 2006/0046125 A1     Mar. 2, 2006

(51) Int. Cl.
*H01M 8/02* (2006.01)
*H01M 2/14* (2006.01)

(52) U.S. Cl. .................. 429/39; 429/34; 429/147
(58) Field of Classification Search ............... None
See application file for complete search history.

(56) References Cited

U.S. PATENT DOCUMENTS

| | | | | |
|---|---|---|---|---|
| 3,432,357 | A | * | 3/1969 | Dankese ................. 429/34 |
| 4,369,236 | A | * | 1/1983 | O'Rell et al. ............. 429/147 |
| 4,430,394 | A | * | 2/1984 | Bechtold ................ 429/147 |
| 4,702,973 | A | | 10/1987 | Marianowski |
| 4,826,554 | A | | 5/1989 | McIntyre et al. |
| 4,933,242 | A | | 6/1990 | Koga et al. |
| 4,981,763 | A | | 1/1991 | Mitsuda et al. |
| 4,988,583 | A | | 1/1991 | Watkins et al. |
| 5,108,849 | A | | 4/1992 | Watkins et al. |
| 5,252,410 | A | | 10/1993 | Wilkinson et al. |
| 5,362,578 | A | | 11/1994 | Petri et al. |
| 5,679,479 | A | * | 10/1997 | Young et al. ............. 429/147 |
| 5,683,828 | A | | 11/1997 | Spear et al. |
| 6,150,049 | A | * | 11/2000 | Nelson et al. ............. 429/39 |
| 6,544,681 | B2 | * | 4/2003 | McLean et al. ........... 429/39 |

FOREIGN PATENT DOCUMENTS

| | | | |
|---|---|---|---|
| DE | 2514034 | | 9/1976 |
| DE | 3812813 | | 6/1989 |
| JP | 1292759 | | 11/1989 |
| JP | 08-050903 | | 2/1996 |
| JP | 9063599 | | 3/1997 |
| JP | 10154519 | | 6/1998 |
| JP | 2004047213 A | * | 2/2004 |
| WO | WO 00/02269 | * | 1/2000 |

* cited by examiner

*Primary Examiner*—Dah-Wei D Yuan
*Assistant Examiner*—Edu E Enin-Okut
(74) *Attorney, Agent, or Firm*—Harness, Dickey & Pierce, P.L.C.

(57) ABSTRACT

An electrically conductive element and a related assembly are provided for use in an electrochemical cell. The electrically conductive separator plate has an upper boundary and a lower boundary. The upper boundary has at least one land formed therein, where the land has a surface defining a first plane and the lower boundary defines a second plane. The first plane extends towards said second plane, so as to intersect with said second plane at an angle greater than zero. An assembly further comprises a compliant layer which substantially conforms to the angled land surfaces, thereby enhancing contact pressure between and across a plurality of components in the compliant layer. A method of assembling such a separator assembly in a fuel cell is also provided.

24 Claims, 9 Drawing Sheets

ELECTROCHEMICAL FUEL CELL ELEMENTS HAVING IMPROVED COMPRESSION OVER CHANNELS

FIELD OF THE INVENTION

The present invention relates to fuel cells, and more particularly to an electrically conductive separator assembly and the manufacture thereof, for such fuel cells.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" (MEA) comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode-assembly is sandwiched between a pair of electrically conductive porous fluid distribution media layers. The MEA together with the fluid distribution elements form a compliant layer, which is then sandwiched between a pair of electrically conductive contact elements that serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar or separator plate. The separator or bipolar plate has two working faces, one confronting the anode of one cell and the other confronting the cathode on the next adjacent cell in the stack, where each bipolar plate electrically conducts current between the adjacent cells. Conductive contact elements at the ends of the stack are referred to as end or terminal separator plates. These terminal separator plates contact an MEA along one side and are adjacent to an end plate of the stack, and collect current and transport gases along a single side (rather than both sides of a bipolar plate). The separator plate elements of the stack thus serve as an electrically conductive separator element between two adjacent cells, and typically have reactant gas flow fields on both external faces thereof, conduct electrical current between the anode of one cell and the cathode of the next adjacent cell in the stack, and have internal passages therein through which coolant flows to remove heat from the stack.

The PEM fuel cell environment is highly corrosive, and accordingly, the separator plates and the materials used to assemble them must be both corrosion resistant and electrically conductive. Bipolar plates are generally fabricated from two separate conductive plates, and may be constructed of electrically conductive metal or composite materials. These individual plates are joined together to form an interior formed between the plates which contains cooling passages. The plates must withstand the harsh conditions of the fuel cell, while providing high electrical conductivity, low weight to improve gravimetric efficiency, and durability for long-term operational efficiency. Further, separator plate contact with adjacent elements must be optimized to enhance fuel cell operation. There remains the challenge to optimize these electrically conductive elements and assemblies made therefrom in a fuel cell to promote efficiency as cost-effectively as possible.

SUMMARY OF THE INVENTION

The present invention relates to an electrically conductive element for use in an electrochemical cell comprising an electrically conductive separator plate having an upper boundary and a lower boundary, wherein the upper boundary has at least one land formed therein. The land has a land surface defining a first plane and a second plane defined by the lower boundary. The first plane extends towards the second plane, so as to intersect with the second plane at an angle greater than zero.

The present invention also relates to an assembly for an electrochemical cell comprising a separator plate having an upper boundary and a lower boundary. The upper boundary comprises one or more lands formed therein, wherein at least one of the lands has an angled surface which defines a first plane. The lower boundary defines a second plane. The first plane intersects the second plane at an angle. A compliant layer having a major surface is adjacent to and in contact with the angled surface of the separator plate upper boundary.

The present invention also relates to methods of assembling a separator assembly according to the present invention, comprising: disposing a rigid plate adjacent to a compliant layer, wherein the plate comprises an upper boundary and a lower boundary. The upper boundary comprises one or more lands having an angled land surface defining a first plane. The lower boundary defines a second plane. The first plane and the second plane intersect with one another, so as to form a first angle. The rigid plate is contacted with the compliant layer. Compressive force is applied to the rigid plate and the compliant layer, where the compliant layer substantially conforms to the one or more land surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
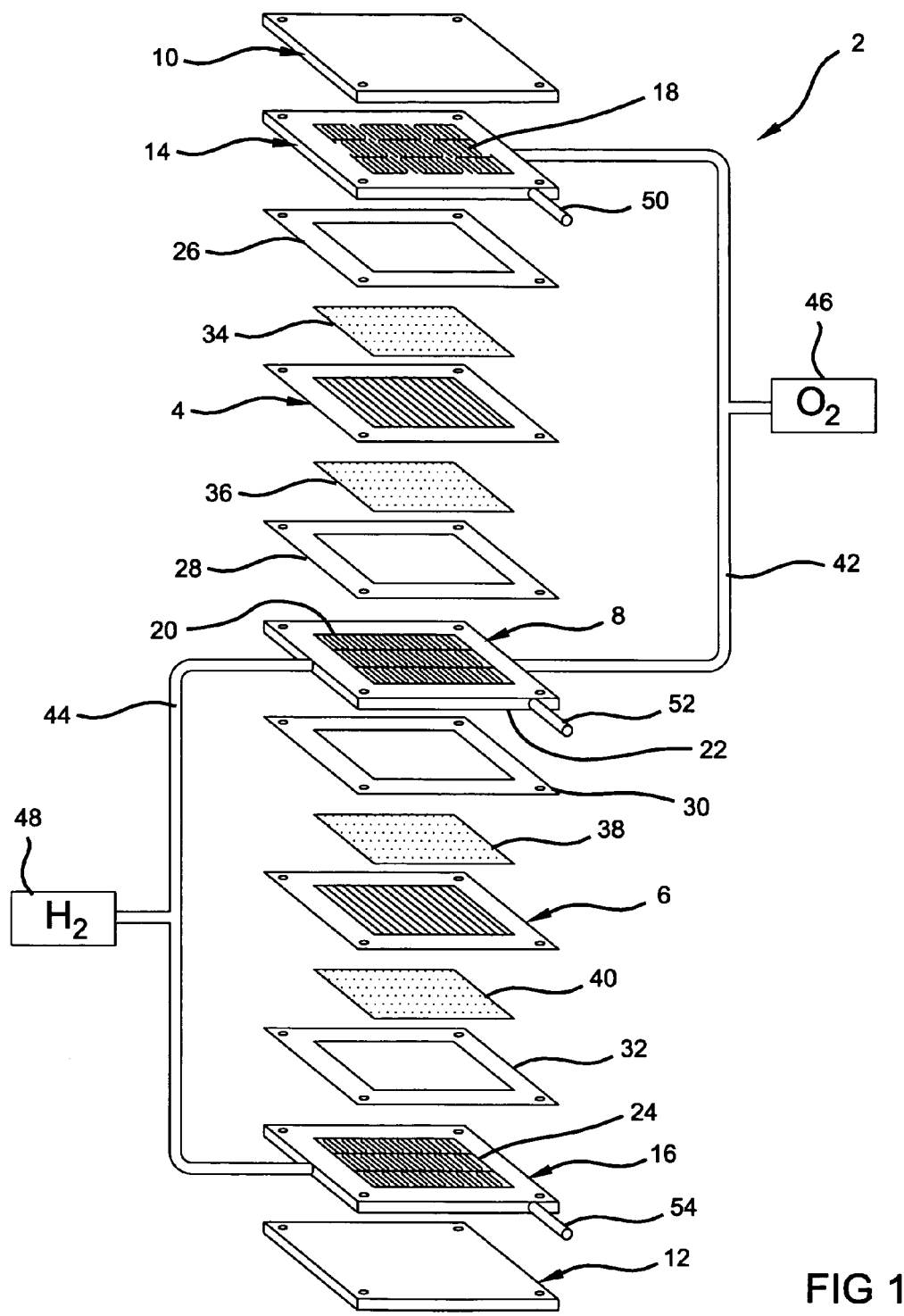
FIG. 1 is a schematic, exploded illustration of an exemplary PEM fuel cell stack (only two cells shown)

The following description of the preferred embodiments is merely exemplary in nature and is in no way intended to limit the invention, its application, or uses. The present invention relates to an improved electrically conductive separator element and a related assembly for a fuel cell system. The improved electrically conductive element has a separator plate with an upper and lower boundary. Certain terminology is used in the following detailed description for convenience only and is not intended to be limiting. For example, the words "upper" and "lower" are intended to nominally designate direction or orientation, as shown in the drawings to which reference is being made, and should not be construed as limiting as to the orientation. Lands and grooves are formed along the upper boundary of the separator plate to form a fluid flow field. "Boundary" refers to the outermost region of the surface, which constitutes the plate's planar surface prior to a flow field being formed, and after forming the flow field coincides with the outermost surfaces of the lands. According to the present invention, one or more of the lands has a surface, which is angled. The slope of the angle, or the pitch, can be determined by comparing a first plane (defined by the land surface) with a second plane defined by the lower boundary. The first plane extends in the direction of the second plane so as to intersect with the second plane at an angle. The angle at the intersection of the first and second planes corresponds to the angle and pitch of the land surface.

Such an element is particularly useful within a fuel cell when arranged in contact with a compliant layer. The angled lands on the conductive element improve contact pressure across and within the components of the compliant layer, thereby providing increased compression between the components and improving fuel cell performance. Under normal fuel cell operating conditions, the fuel cell stack, including all the several components are under an external compressive force. When compression force is applied, the compliant layer contacts and conforms to the one or more angled surfaces. In this manner, the deformation of the compliant layer would provide improved contact pressure distribution between the components within the complaint layer, as will be described further below. To gain a better understanding of the areas in which the present invention is useful, a description of an exemplary fuel cell is provided below.

FIG. 1 depicts a two cell, bipolar fuel cell stack 2 having a pair of membrane-electrode-assemblies (MEAs) 4 and 6 separated from each other by an electrically conductive fluid distribution separator element 8, hereinafter bipolar plate 8. The MEAs 4 and 6 and bipolar plate 8, are stacked together between stainless steel clamping plates, or end plates 10 and 12, and terminal fluid distribution separator plate contact elements 14 and 16. The terminal contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6, with opposite charges that are separated, hence the so-called "bipolar" plate. Nonconductive gaskets 26, 28, 30, and 32 provide seals and electrical insulation between the several components of the fuel cell stack. Conductive porous fluid distribution media layers are typically carbon or graphite, diffusion or distribution papers or cloth or foam 34, 36, 38, and 40 that press up against the electrode faces of the MEAs 4 and 6. As referred to herein, the carbon/graphite distribution media is generally referred to as "paper" however may be any form of distribution media known to one of skill in the art. The terminal contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the bipolar plate 8 and terminal plates 14 and 16. Appropriate plumbing for exhausting coolant from the bipolar plate 8 and terminal plates 14 and 16 is also provided, but not shown.

Figure 2:
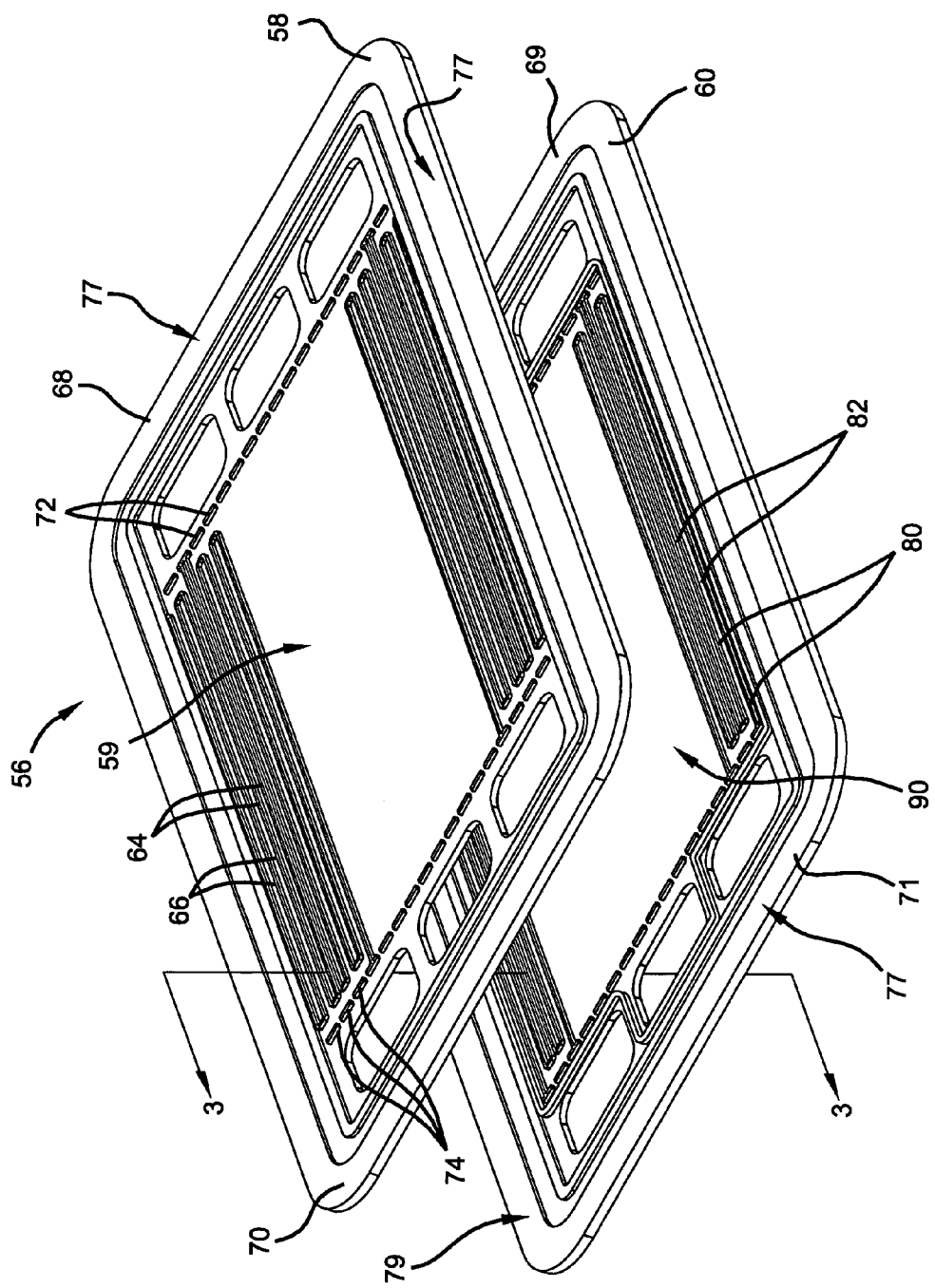
FIG. 2 is an exploded view of an exemplary electrically conductive separator plate assembly useful with PEM fuel cell stacks.

The present invention relates to conductive separator elements in a fuel cell, such as the exemplary liquid-cooled, bipolar separator plate 56 shown in FIG. 2, which separates adjacent cells of a PEM fuel cell stack; conducts electric current between adjacent cells of the stack; and cools the stack. The bipolar plate 56 comprises a first exterior separator plate 58 and a second exterior separator plate 60. As described herein, the fuel cell stack is described as having conductive bipolar plate elements, however the present invention is equally applicable to conductive elements within a single fuel cell or at the terminal ends of a stack, where only a single separator plate is employed.

The exterior plate 58 has a first upper boundary 59 which confronts an anode of an MEA (not shown) and has a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, and an external compressive force is applied, the lands 64 press against a compliant layer (such as layer 120 of FIG. 4) comprising fluid distribution media layers of carbon/graphite papers (such as 36 or 38 in FIG. 1) which, in turn, press against the MEAs (such as 4 or 6 in FIG. 1, respectively). For drafting simplicity, FIG. 2 depicts only two arrays of lands 64 and grooves 66 in the flow field. In reality, the lands and grooves 64,66 will cover the entire external surface upper boundary 59 of the plate 58 that engages the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. Each plate 58,60 has an outer peripheral region 77, which is typically electrically non-conductive because it is external to the region occupied by the electrically active MEA.

Figure 3:
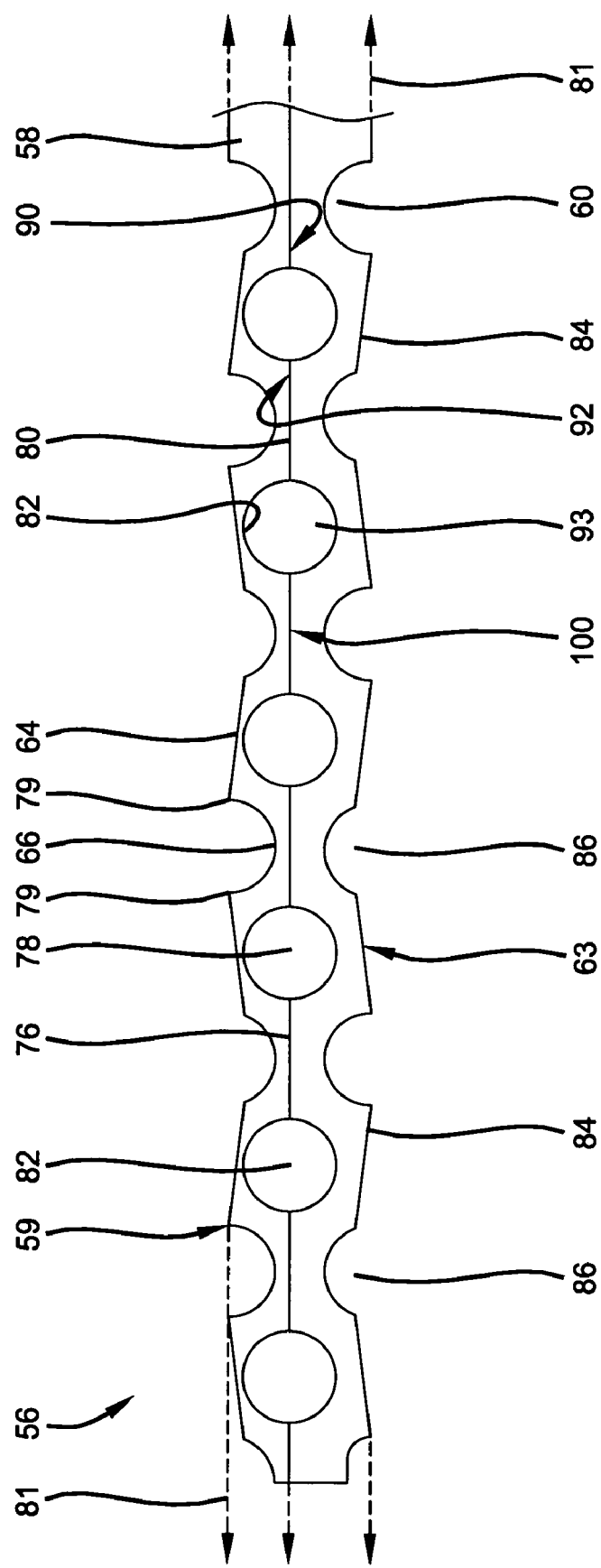
FIG. 3 is a sectional view in the direction of 3-3 of FIG. 2.

As best shown in FIG. 3, the underside of the plate 58 forms a lower boundary 90 which includes a plurality of ridges 76 which define therebetween a plurality of channels 78 through which coolant passes during the operation of the fuel cell. A coolant channel 78 underlies each land 64 while a reactant gas groove 66 overlies each ridge 76. Alternatively, the plate 58 could be flat and the flow field formed in a separate plate of material. In either circumstance, the lower boundary 90 occurs at the outermost surfaces 79 of the lands 64 where a tangential plane 81 is formed. Plate 60 is similar to plate 58. In this regard, there is depicted a plurality of lands or ridges 80 defining therebetween a plurality of grooves or channels 82. Coolant flows from one side 69 of the bipolar plate to the other 71 (as shown in FIG. 2). The lower boundaries 90,92 comprise heat exchange (coolant side) surfaces of the respective first and second plates 58,60, which confront each other so as to define therebetween the coolant flow passages 93 adapted to receive a liquid coolant, and are electrically coupled to each other at a plurality of joints, or electrically conductive contact regions 100. Like plate 58 and as best shown in FIG. 3, the external side of the plate 60 has an upper boundary 63 facing a cathode of another MEA having a plurality of lands 84 thereon defining a plurality of grooves 86 through which the reactant gases pass.

Coolant flows within the passages 93 formed by plates 58,60 respectively, thereby breaking laminar boundary layers and affording turbulence which enhances heat exchange with inside surfaces of the lower boundaries 90, 92 of the plates 58,60, respectively. As recognized by one of skill in the art, the electrically conductive separator elements according to the present invention may vary in design from those described above, such as for example, in the configuration of flow fields, placement and number of fluid delivery manifolds, and the coolant circulation system, however, the function of conductance of electrical current through the surface and body of the separator plate elements functions similarly between all designs.

Figure 4:
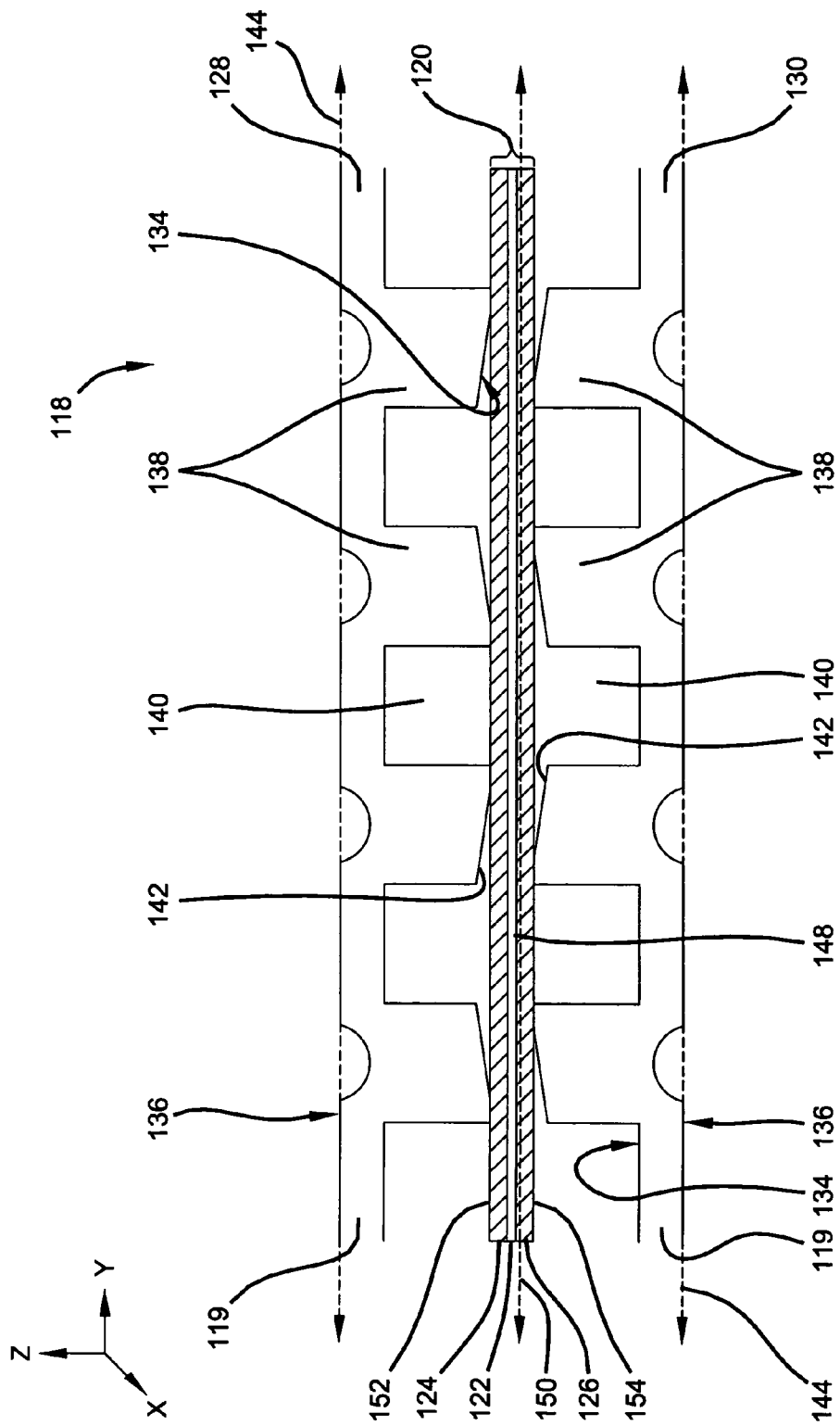
FIG. 4 is a magnified sectional view of an assembly according to the principles of the present invention in the absence of an external compressive force.

One preferred embodiment of a separator assembly 118 according to the present invention is shown in FIG. 4. The assembly 118 comprises one or more separator plates 119 and at least one compliant layer 120. The compliant layer 120 comprises an MEA 122 surrounded by a first fluid distribution media layer 124 and a second fluid distribution media layer 126. In preferred embodiments of the present invention, the compliant layer 120 comprising the distribution media layers 124,126 and the MEA 122, are all constructed of materials that are non-rigid, or compliant, such that the compliant layer 120 has flexibility in at least one axial direction. Each respective fluid distribution media layer 124, 126 is bordered by a first separator plate 128 and a second separator plate 130 (which are each shown here as half of a typical bipolar plate).

Each separator plate 119 has an upper boundary 134 and a lower boundary 136, with the upper and lower designations referring to the proximity to the compliant layer 120. A plurality of lands 138 and grooves 140 are formed in the upper boundary 134. The lands 138 each have a land surface 142. As shown in FIG. 4, the several components of the assembly 118 are arranged in contact with one another, however, there is no external compressive force applied to the assembly 118. Thus, the compliant layer 120 (i.e. distribution media layers 124,126 and the MEA 122) are substantially planar along a horizontal plane 144 corresponding to the lower boundary 136 and have no localized deformations in the z-axis direction. While in the absence of the compressive force, a bulk of a body 148 of the compliant layer 120 defines a plane 150. When the separator plates 119 are arranged in contact with the fluid distribution media layers 124, 126, a major surface 152 of the first distribution media layer 124 contacts the land surfaces 142 of the first separator plate 128, and a major surface 154 of the second distribution media layer 126 contacts the land surfaces 142 of the second separator plate 130.

One aspect of the present invention provides an increase in the operational efficiency of the fuel cell, which appears to be improved by increasing the contact pressure within the components of the compliant layer 120. In particular, a higher contact pressure induced between the MEA 122 and fluid distribution layers 124, 126 positively impacts operational efficiency. At relatively low contact pressures, there is a potential for gaps to occur between the fluid distribution media layers 124, 126 and the MEA 122, which can potentially impact the operation of the fuel cell by diminishing electrical, thermal, and fluid conduction therebetween.

Figure 5:
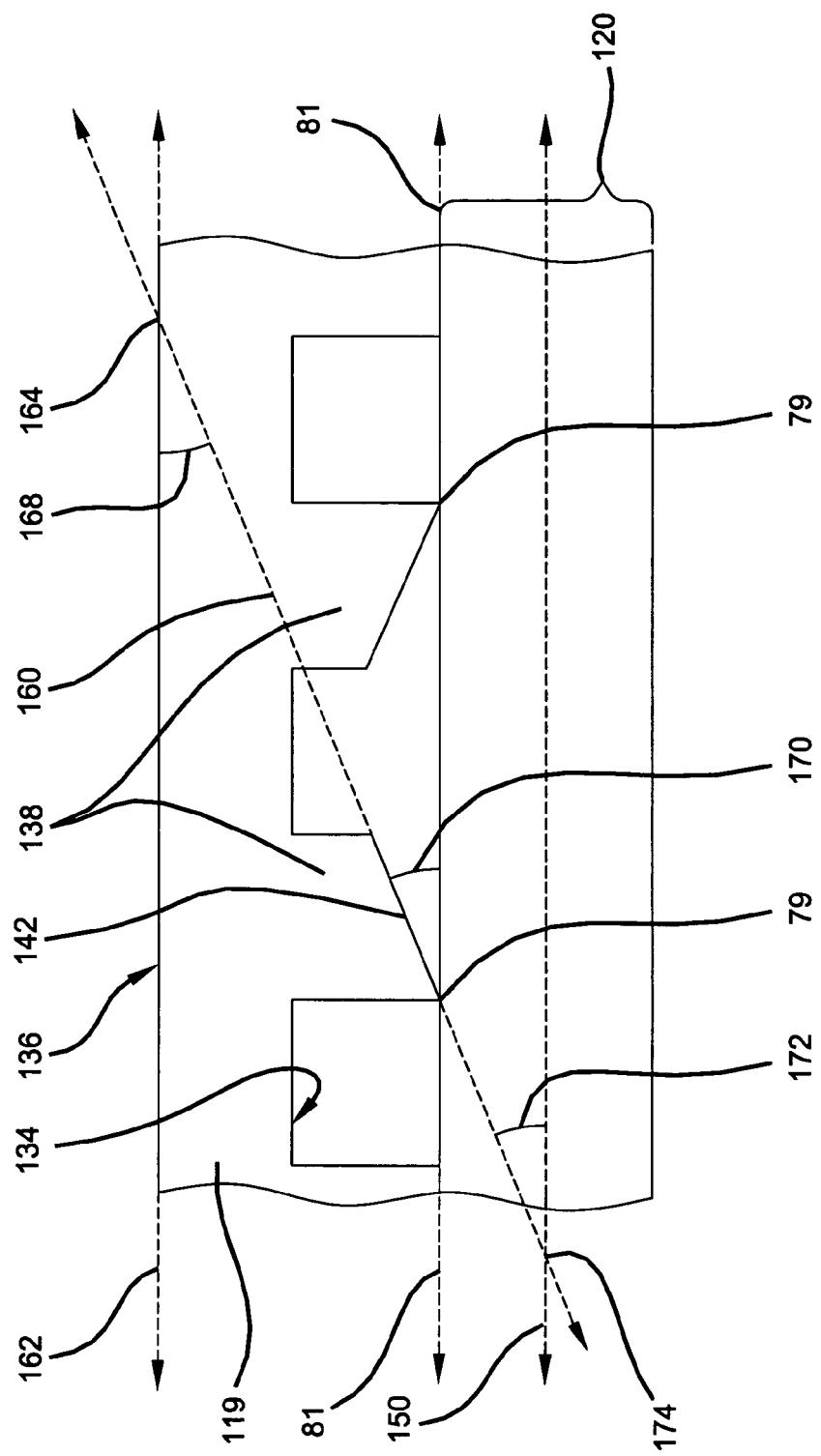
FIG. 5 is a magnified portion of the separator element of FIG. 4 adjacent to a compliant layer in accordance with the principles of the present invention.

FIG. 5 is a detailed partial view of a section of FIG. 4, showing a preferred embodiment of the present invention where one or more of the land surfaces 142 of the separator plate 119 are angled. The separator plate 119 has upper and lower boundaries 134, 136. The angled land surfaces 142 define a first plane 160. The lower boundary 136 of the separator plate 119 defines a second plane 162. The first plane 160 extends in the direction of the second plane 162 to intersect with the second plane 162. At an intersection 164 of the first and second planes 160,162, a first intersection angle 168 is formed that relates to an angle 170 of the land surface 142 with respect to the tangential plane 81 to the outermost portions 79 of the lands 138. The tangential plane 81 at the outermost land surface 142, likewise is parallel to the second plane 162 and the first intersection angle 168 is an alternate interior angle to the land surface angle 170 formed between the land surface 142 and the tangential plane. The slope of the angled land surface 142 of the land 138, can also be designated the "pitch" of the land surface 142. The degree of the first intersection angle 168 can be determined respective to the second plane 162, for example, a counterclockwise angle 168 rising from the second plane 162 is a positive sign (and correlates to a positive land surface angle 170), which corresponds to a positive pitch of the angled land surface 142. Likewise, a negative intersection angle 168 occurs where the angle 168 rises from the second plane 162 in a clockwise rotation, and corresponds to a negative land surface angle 170.

The determination of the degree and sign of the land surface angle 170 may also be determined in an alternate manner. In the absence of an external compressive force, the plane 150 defined by the compliant layer 120 is parallel to the second plane 162 of the lower boundary 136 of the separator plate 119 (as well as to the tangential plane 81). The first plane 160 intersects the compliant layer plane 150 at a second intersection angle 172. The first plane 160 defined by the land surface 142 thus intersects both of the parallel planes (i.e. the second plane 162 and the compliant layer plane 150) forming alternate interior angles (i.e., 168,172) at the respective intersections 164,174 which both correspond to the land surface angle 170. In the case where the land surface angle 170 is determined by the second intersection angle 172, the sign of the angle 172 is determined by rotation respective to the compliant layer plane 150 (and thus results in the same sign as that determined for the first intersection angle of the first intersection 164). Thus, the degree and signs of the angles 168,172 are the same via either manner of determination and both correlates to the same land degree angle 170. It should be noted that in the prior art, the first plane 160 does not intersect with either the second plane 162 of the lower boundary 136 of the separator plate 119, or with the compliant layer plane 150, because the lands 138 have traditionally been formed with horizontal surfaces that are parallel to both of the planes 162,150 (and thus, the tangential plane 81 becomes a plane parallel to the entire land surface 142). Further, the second method of determining the angle 170 (and pitch) of the land surface 142 with respect to the compliant layer 120 is only useful in the absence of an external compressive force.

Selection of the material of construction for the separator plates 119 includes weighing such parameters as overall density (mass and volume); durability, flexibility, strength, toughness for handling, electrical conductivity and resistance, pattern definition, thermal and pattern stability, machinability, cost and availability, as well as corrosion and oxidation resistance within the fuel cell environment. Thus, some of the important considerations for the separator plate 119 material include performance as an electrical current conductor in electrically active regions, while having the ability to withstand any corrosive conditions in the non-conductive distribution/header regions. Thus, the plates 119 may be formed from electrically conductive metals, metal alloys, or composite materials. As recognized by one of skill in the art, available materials for the separator plates 119 include metals and metal alloys comprising aluminum, magnesium, titanium, and stainless steel.

In certain preferred embodiments of the present invention, the separator plates 119 are formed of composite materials, which lend themselves to more facile shaping of the angled land surfaces 142, as well as handling during manufacturing. Such composites are preferably electrically conductive and comprise polymer binders and conductive filler materials. Preferred polymers for the binder are water-insoluble when cross-linked, cured, or solidified and can withstand the hostile oxidative and acidic environment of the fuel cell. Such polymers include for example, both thermoplastic and thermoset polymers including: epoxies, silicones, polyamide-imides, polyether-imides, polyphenols, fluoro-elastomers (e.g., polyvinylidene fluoride), polyesters, phenoxy-phenolics, epoxide-phenolics, acrylics, urethanes, epoxy vinyl ester, vinyl ester, polyamides, polyimides, and mixtures and equivalents thereof. Particularly preferred polymers include polypropylene, polyamides, polyimides, epoxy vinyl ester resin, vinyl ester resin, epoxy, and mixtures thereof.

Conductive filler materials may comprise particles, fibers, woven materials, cloth, and the like. Preferred conductive filler materials are, for example, gold, platinum, graphite, carbon, graphite, expanded graphite, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. The conductive filler materials comprise varying volumetric ranges of the polymer and conductive material matrix, ranging from about 10 to 80% conductive materials per total volume.

In certain preferred embodiments, it is preferred that the separator plates 119 are made as thin as possible (e.g., less than 0.1 inches thick, preferably between about 0.002-0.02 inches or 0.05-0.5 mm thick). The plates 119 may be formed by any method known in the art, depending on the material selection, and include machining, molding, patterning, cutting, carving, stamping, photo etching such as through a photolithographic mask, or any other suitable design and manufacturing process, depending on the materials selected. It is contemplated that the plates 119 may comprise a dual structure including a flat plate and an additional plate including a series of exterior fluid flow channels.

Figure 6:
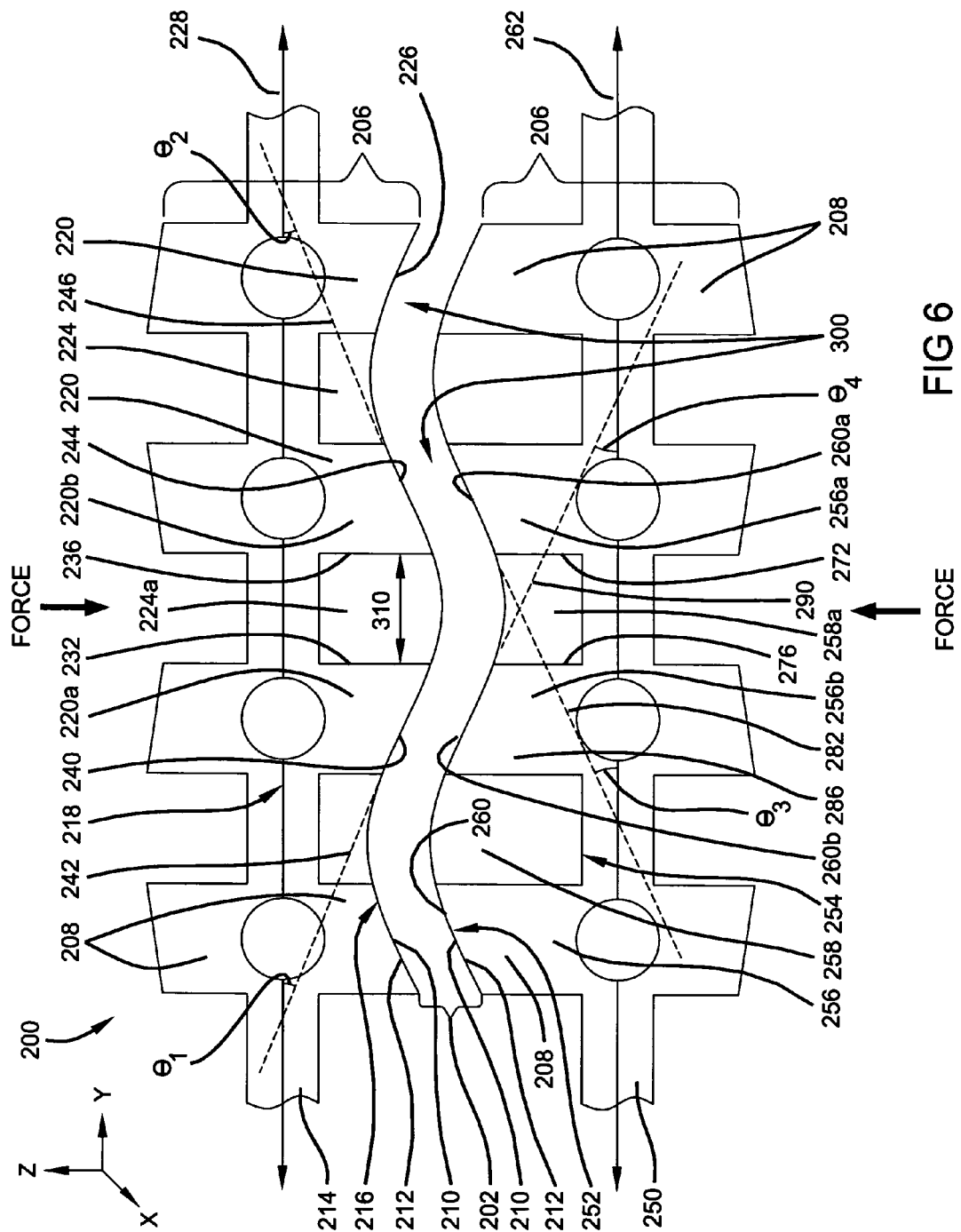
FIG. 6 is a sectional view of an assembly according to the principles of the present invention under an external compressive force.

FIG. 6 depicts an assembly 200 having a compliant layer 202 sandwiched between two bipolar plate separator elements 206 having a plurality of lands 208 where one or more of these lands 208 is formed in accordance with one preferred embodiment of the present invention. An external compressive force is applied to the assembly 200. As previously discussed, during normal operations a fuel cell stack is operated under compressive force. Presently, this external compressive force ranges from about 25 to 600 psi (approximately 170 kPa to about 4200 kPa). However, as appreciated by one of skill in the art, the pressure may vary from this range and still will be equally applicable to the present invention. Thus, when an external compressive force is applied to the assembly 200, the compliant layer 202 contacts and substantially conforms to surfaces 210 of the plurality of lands 208. By "substantially conforms" it is meant that major surfaces 212 of the compliant layer 202 contact the angled land surfaces 210 and are deformed in an axial z-direction at the contact regions, however, may not be significantly deformed over regions not contacting a land 208. The conformation causes deformation of the compliant layer 202, which increases contact pressure within the components of the compliant layer 202, as will be discussed in more detail below.

The embodiment shown in FIG. 6 has a first separator plate 214 having a first separator plate upper boundary 216 and a first separator plate lower boundary 218. A plurality of first separator plate lands 220 are interspersed with first separator plate grooves 224, which are formed in the first separator plate upper boundary 216, where one or more of the plurality of lands 220 has an angled surface 226 with alternating pitches (slopes or angles) with respect to the first lower boundary 218 defining a first lower boundary plane 228. Thus, in the first separator plate 214, an exemplary single groove 224a is bordered on a first side 232 by a first land 220a and on a second and opposite side 236 by a second land 220b. The first land 220a has a surface 226a defining a first land surface plane 242 that intersects with the lower boundary plane 228, forming a negative angle ($\Theta_1$) and thus the land surface 226a has a negative pitch. The second land 220b has a surface 226b defining a second land surface plane 246 that intersects with the lower boundary plane 228, forming a positive angle ($\Theta_2$), thus the land surface 226b has a positive pitch. In the embodiment shown, an alternating pattern of positive and negative pitches on adjacent angled land surfaces (e.g., 220a, 220b) is repeated across the portion of the flow field shown in the upper boundary 216 of the first separator plate 214.

A second separator plate 250 has a similar land configuration, where the second separator plate 250 has a second separator plate upper boundary 252 and a second separator plate lower boundary 254. A flow field is formed in the second separator plate upper boundary 252 comprising a plurality of lands 256 and grooves 258. The plurality of lands 256 have one or more surfaces 260 with alternating pitches, with respect to a plane of the second separator plate lower boundary 262, in the same configuration as described above for the first separator plate 214.

A second exemplary groove 258a in the second separator plate 250 is bordered on a first side 272 by a third land 256a and on a second and opposite side 276 by a fourth land 256b. The third land 256a has a surface 260a with a third land surface plane 282 that intersects with the second separator plate lower boundary plane 262, forming a positive angle ($\Theta_3$) and thus the third land surface 282 has a positive pitch. The fourth land 256b has a surface 260b with a fourth land surface plane 290 that intersects with the second separator plate lower boundary plane 262, forming a negative angle ($\Theta_4$), thus the fourth land surface 260b has a negative pitch. In the embodiment shown, the second separator plate 250 has an alternating pattern of positive and negative pitches for adjacent lands (e.g., 256a, 256b) repeated across the portion of flow field shown when in FIG. 6, with the lands formed in the upper boundary 252 of the second separator plate 250, is the same as a first separator plate 214 flowfield configuration.

In certain preferred embodiments, the first land surface 226a of the first plate 214 and the fourth land surface 260b of the second plate 250, which physically oppose one another across the compliant layer 202 are parallel to one another and hence have opposite signs of their angle and pitch, such that, for example, the first land surface 226a has a negative angle $\Theta_1$ (and pitch) where the fourth land surface 260b has a positive angle $\Theta_4$ (and pitch), respective to the lower boundaries 218,262 of each respective plate 214,250. Thus, the signs of the adjacent land surface angles $\Theta_1$ and $\Theta_2$, which alternate across the flow field of the first plate 214, are opposite to the corresponding signs of the lands 256 across the second plate 250. A plurality of compression regions 300 are formed across the compliant layer 202 between each of the opposing lands 220,256 of the first separator plate 214 and the second separator plate 250. In this manner, the compliant layer 202 conforms to the angled land surfaces (e.g., 226a, 226b, 260a, 260b) and has deformations in at least one z-axis direction. The angled land surfaces 226a, 226b, 260a, 260b form undulations along the major surfaces 212 of the compliant layer 202, as the compliant layer 202 deforms in the respective compression regions 300 between the opposing land surfaces (e.g., 226a and 260b or 226b and 260a). The undulating pattern along the major surfaces 212 of the compliant layer 202 conforms to the flow field of the separator plates 214,250 and provides an improved contact pressure across the entire body of the compliant layer 202.

As appreciated by one of skill in the art, any pattern of land angles and pitches may be used to improve the contact pressure across the components within the compliant layer 202. Thus, the present invention may comprise one or more lands 208 having a first angle, and one or more lands 208 having a second angle, where the angles are different from one another. The lands 208 having the first angle may be adjacent to or opposed to the lands having the second angle. The contact pressure across the flowfield may be optimized by using multiple different angles for the plurality of the lands 208. Thus, any number of combinations of angles and pitches may be used, and further is not necessary to have only angled lands 208, but rather it is possible to have angled lands 208 interspersed with horizontal flat lands 208 (having an angle of zero) to achieve an overall improvement in the contact pressure across the major surface of the compliant layer. Further, angled lands 208 may be employed along only one separator plate (e.g. only on 214 rather than on opposing separator plates 214 and 250) or may form only a small percentage of the total plurality of lands 208 to achieve an overall improvement in contact pressure across the overall compliant layer 202.

As shown in FIG. 6, the first groove (or channel) 224a is surrounded by the first and second lands 220a, 220b of the first plate 214. A span 310 extends from the first land to the second lands 220a, 220b corresponding to an area of the compliant layer 202 without direct contact with the land 220. It is desirable to maintain a high contact pressure across the entire major surface 212 of the compliant layer 202 to enable a relatively high contact pressure between the distribution media and the MEA (shown at 122,124,126 in FIG. 4) at all points irrespective of whether physical contact with the land 220 is established. However, there are competing interests in optimizing the flow field design. Traditionally, a reduction in channel width increases contact pressure within the span 310 of the compliant layers 202 (corresponding to a groove (e.g., 224). However, from a fuel cell operations standpoint, it is desirable to have deep and wide channels, both to improve fluid transport (volumetric flow rate of product water, reactant and effluent gases), as well as to reduce pressure drop across the flow field. However, due to limitations of the presently known bipolar plate materials, reducing channel width requires shallow channel depths because of limited material stretch during the forming process. Thus, in the past, optimizing the performance of the fuel cell included tolerating lower contact pressures to provide a sufficiently wide and deep fluid flow channel for increasing flow rate and reducing pressure drop.

Thus, the present invention provides a method of increasing the contact pressure in an electrically conductive element assembly, while not compromising the depth and width of the fluid flow channels. In forming land surfaces 210 that are angled with respect to the lower boundary plane (such as 218) of the separator plate (such as 214), a contact pressure measured at the mid-point of the span 310 is significantly improved over measurements taken with the prior art land design, as discussed below. Although not wishing to be bound by any particular theory, it is believed that the several members of the compliant layer 202 are more intimately contacted with one another based upon bending the components over the span region 310, which appears to improve the interfacial shear stress between the several components of the compliant layer 202. Hence, the contact pressure increases both at the spans 310 and across the entire major surface 212, as well as through the bulk of the compliant layer 202.

In preferred embodiments of the present invention, the angles of the lands 208 are designed to account for both the relative flexibility of the respective components of the compliant layer 202, as well the height of the separator plate 206. Thus, materials of construction for certain distribution media layers (such as, for example, 124, 126 of FIG. 4) are stiffer than others, for example, a carbon cloth Toray paper only needs a relatively low angle (i.e., small angle degree), while a more compliant, less stiff distribution media layer, such as, carbon cloth commercially available as Elat cloth (sold by E-TEK division of De Nora N.A., Inc. of Somerset, N.J.) would need a relatively large angle corresponding to a steeper pitch of the land surface. However, as appreciated by one of skill in the art, it is desirable not to distort the material beyond its strength of elasticity or to permanently deform the material or otherwise damage the compliant layer 202. Further, it is preferred that the angle of the land surface 210 does not require constructing a thicker separator plate 206, which would result in a larger volume stack. In preferred embodiments, an upper limit to the land angle degree is a function of the channel width distance and the relative angle, and preferably the land angle degree does not exceed a value where it requires cutting into the height of the separator plate 206, and hence increasing the height of the separator plate 206. Thus, in preferred embodiments of the present invention, the range of values for the angle of the land is greater than 0 and less than 45°. Most preferably, the angle of the land is between about 1° and about 15°. It is recognized that the present invention is compatible with land angles exceeding 45°, but that it will generally increase the volume of the overall stack by increasing the separator plate thicknesses, which may reduce the gravimetric efficiency of the stack.

EXAMPLE 1

Figure 7:
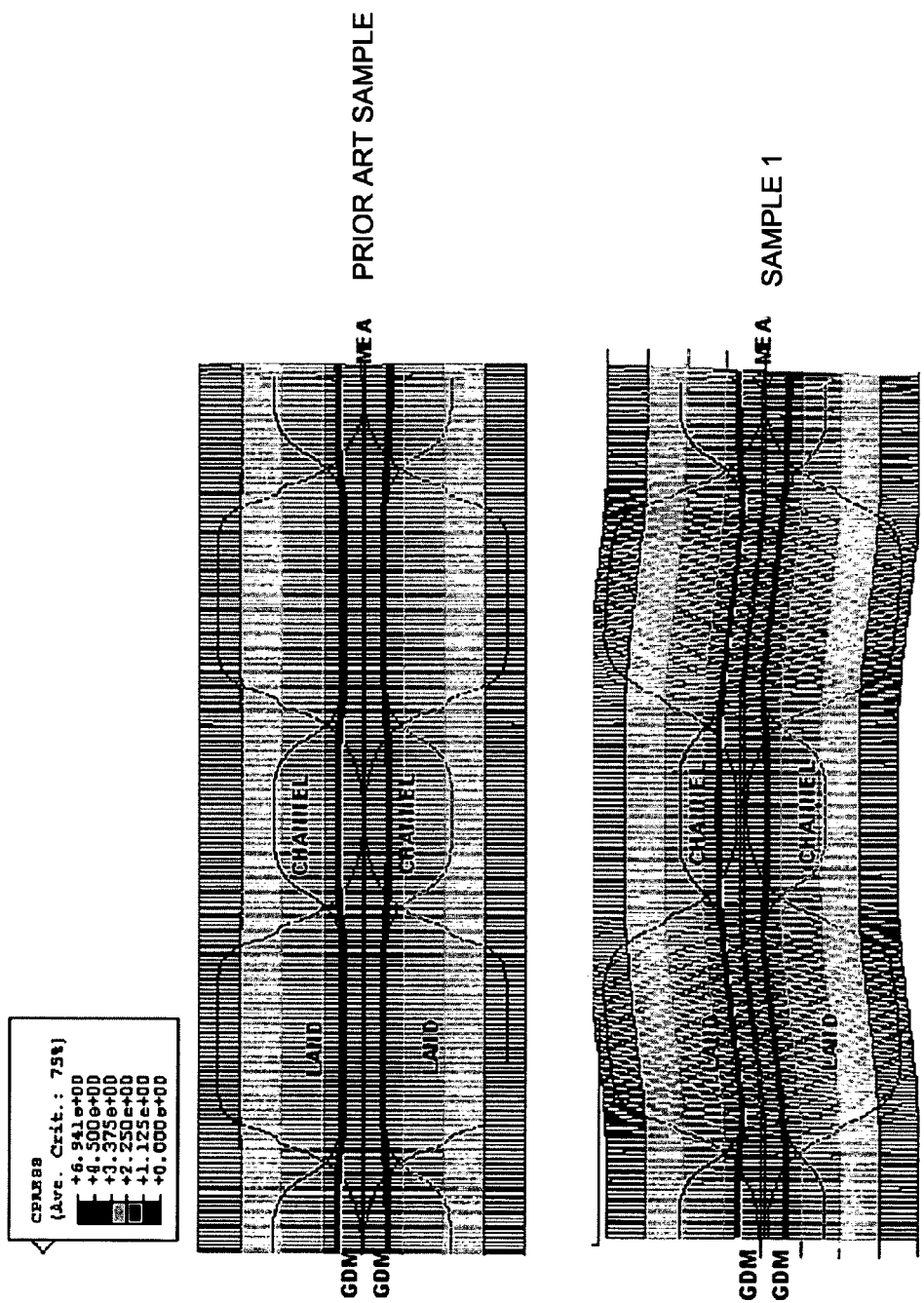
FIG. 7 is a finite element analysis computer based model comparing a separator plate of the prior art with a sample made in accordance with one preferred embodiment of the present invention.

In FIG. 7, a comparison by finite element analysis based computer modeling was performed to evaluate the contact pressure at the spans of the compliant layer corresponding to the channels or grooves in the flow field, between a land design of the prior art versus a land design according to the present invention. All of the separator plates used (in Sample 1 and the Prior Art Sample) were constructed of stainless steel of 0.2 mm thick. Two separator plates were used in both Samples, each having upper boundaries with land and grooves formed therein, with the separator plates sandwiching a compliant layer. The compliant layer comprises two external carbon fiber gas diffusion/distribution media layers that are 180 μm thick Toray 7% teflonated 060 paper available from the Toray Industries, Inc. of Tokyo, Japan. The compliant layer also comprises a 42 μm thick GORE membrane electrode assembly, commercially available as Gore 55 SERIES MEA from W. L. Gore and Associates, Company, of Elkhart, Md. The land width is 2 mm and the channel width is 1.8 mm. For the Prior Art Sample, the land angle is 0°, and the land angle of Sample 1 is 3.2°, alternating between positive and negative angles at adjacent lands, and opposite signs of angles at opposing lands. The channel width of the Prior Art Sample and Sample 1 were both 1.8 mm. For the Prior Art Sample, the contact pressure at the center/mid-point of the span was 0.06 MPa (8.7 psi), and for Sample 1, the contact pressure at the center/mid-point was 0.09 MPa (13 psi). The improvement of contact pressure taken at the mid-point of the span is an increase of 50% when comparing Sample 1 to the Prior Art Sample.

EXAMPLE 2

Figure 8:
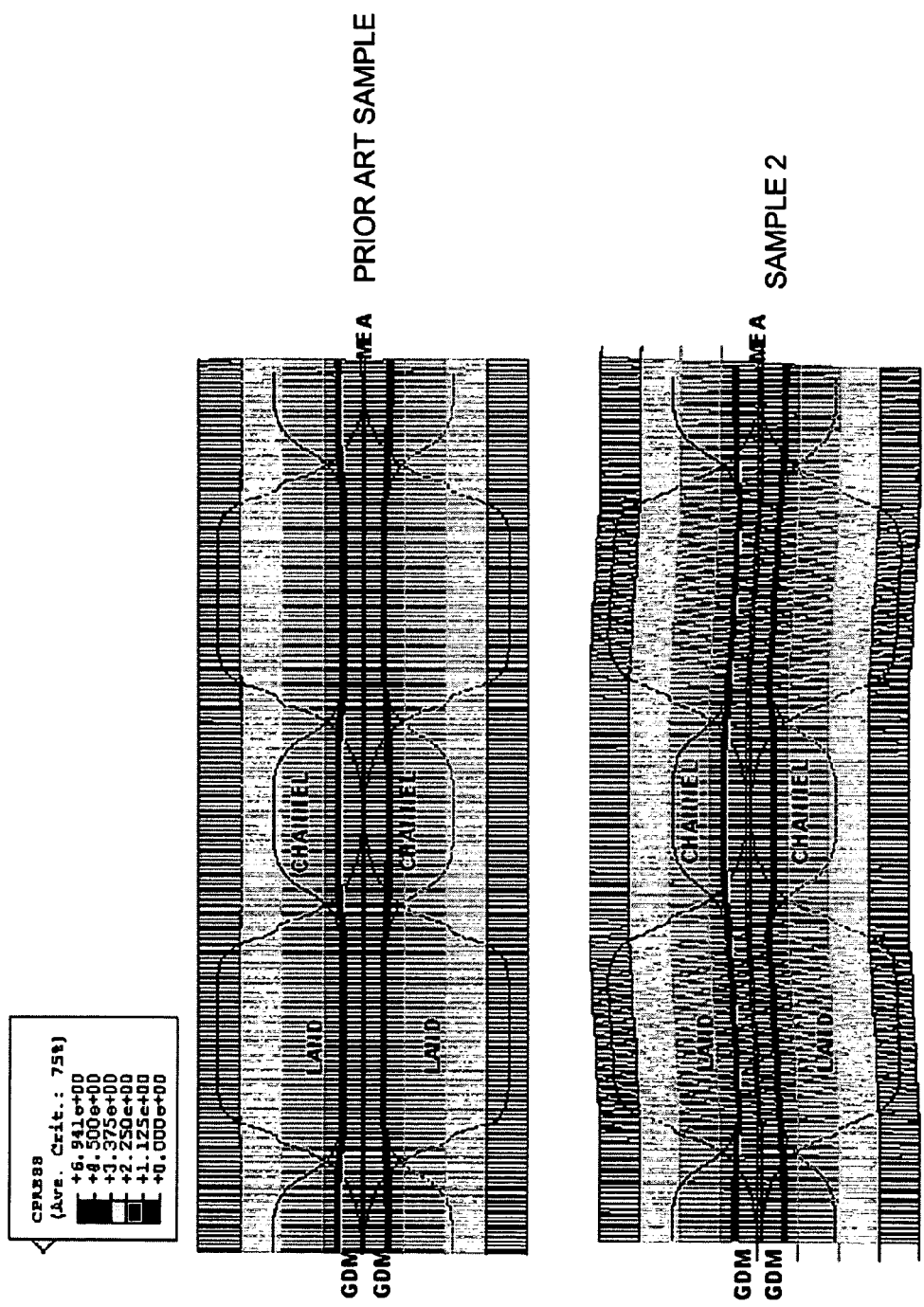
FIG. 8 is a finite element analysis computer based model comparing a separator plate of the prior art with a sample made in accordance with one alternate preferred embodiment of the present invention.

In FIG. 8, a second example is demonstrated, where the same Prior Art Sample as described in Example 1 was used for comparison to an alternate preferred embodiment prepared in accordance with the present invention, Sample 2. The materials and dimensions of the lands and grooves are the same for both the Prior Art Sample and Sample 2. The Prior Art Sample has a zero degree angle land surface, whereas the angle of the land surfaces of Sample 2 are 6.4°. The contact pressure for the Prior Art Sample at the center/midpoint of the span of the compliant layer was 0.06 MPa (8.7 psi). The contact pressure at the center/midpoint of the span for Sample 2 was 0.15 MPa (22 psi) which corresponds to an increase in a contact pressure of approximately 150% when comparing Sample 2 to the Prior Art Sample.

Figure 9:
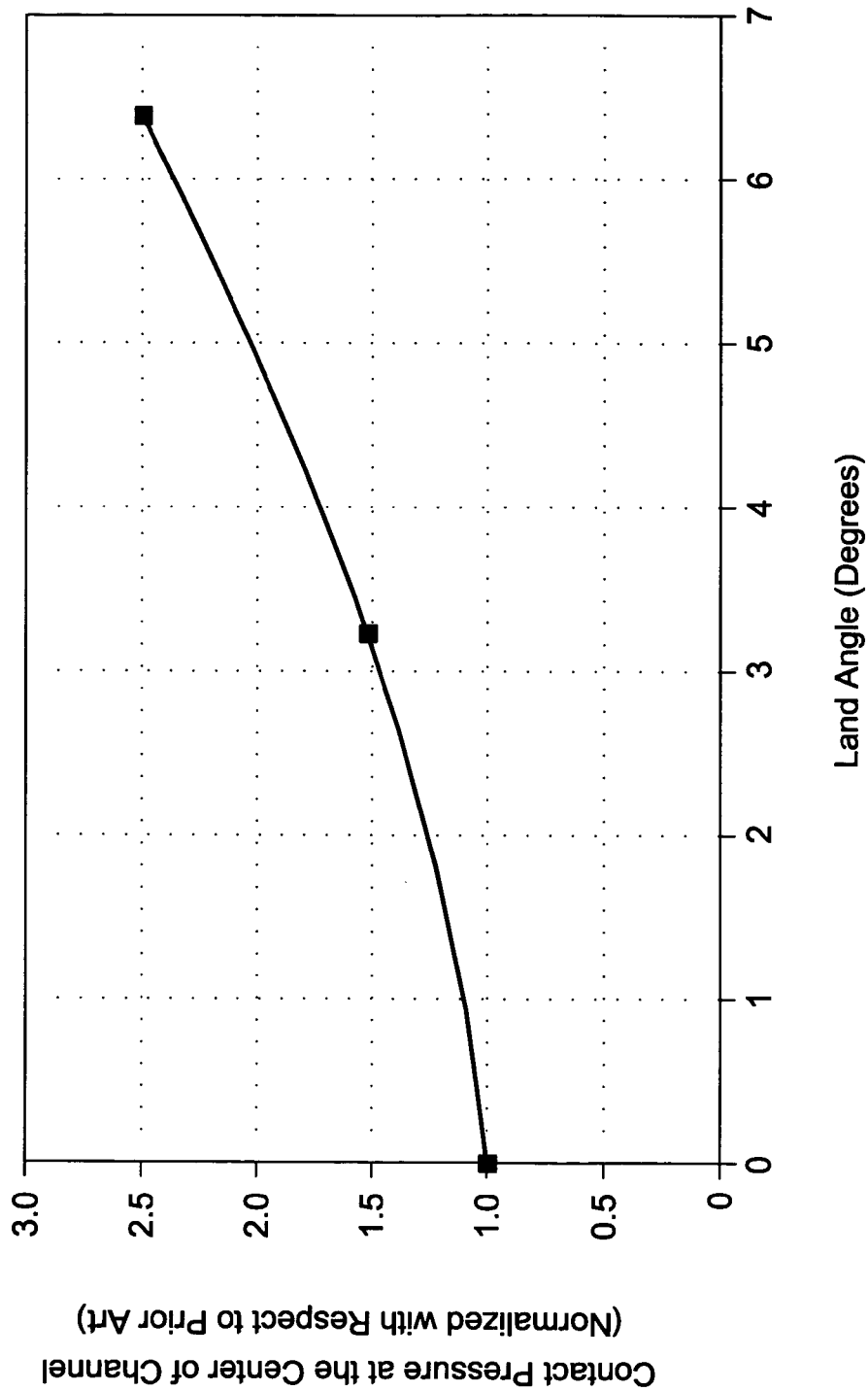
FIG. 9 is a graph of contact pressure at the center/mid-point of a channel in an assembly of one preferred embodiment of the present invention (normalized with respect to the prior art) versus land angle in degrees.

FIG. 9 shows a comparison of the contact pressure at the midpoint of the channel versus the land angle of the land surfaces. The graph has been normalized with respect to the prior art to demonstrate the improvement of the contact pressure coinciding with the increase in angle of the land surfaces. A land degree of zero correlates to the prior art having a normalized contact pressure value of one. However, as can be observed from the data, the contact pressure increases when there is any degree of land angle, and increase to double that of the prior art at approximately 5° for the land surface.

As can be appreciated by one of skill in the art, an improved contact pressure provides greater flexibility in flow field design, because an enhanced contact pressure enables a wider range of options for channel dimension (i.e. widths and depths). The improved contact pressure provided by the present invention may be employed to increase contact pressure to form wider channels while maintaining a sufficient contact pressure. In situations where the channel width is generally the same as the dimensions described in the Examples above, the contact pressure is significantly increased at the midpoint of the span. Alternatively, the present invention may allow for a wider channel while maintaining a permissible, but relatively low contact pressure. Thus, one aspect of the present invention is much greater flexibility in fuel cell design for optimizing efficiency and operation.

Another feature of the present invention provides a method of assembling a separator assembly for an electrochemical cell. The method comprises disposing a rigid plate comprising one or more lands adjacent to a compliant layer, where each land has a land surface defining a first plane. The rigid plate is contacted with the compliant layer, where the first plane of the land surface extends towards and intersects with a second plane defined by a major surface of the compliant layer, so as to form an angle. Compressive force is applied to both the rigid plate and the compliant layer, where the compliant layer substantially conforms to the one or more land surfaces.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically conductive element for use in an electrochemical cell comprising:
an electrically conductive separator plate having an upper boundary and a lower boundary, wherein said upper boundary has at least one land formed therein, said land having a planar land surface defining a first plane and said lower boundary defining a second plane, wherein said first plane extends towards said second plane, so as to intersect with said second plane at an angle greater than zero to define a land angle of said planar land surface of greater than zero.

2. The conductive element according to claim 1 wherein said angle is greater than zero and less than or equal to 45°.

3. The conductive element according to claim 1 wherein said angle is between 1° and 15°.

4. The conductive element according to claim 1 wherein a plurality of lands and grooves are formed along said upper boundary to create a fluid flow field.

5. The conductive element according to claim 4 wherein said plurality of lands formed along said upper boundary comprises a first land and a second land adjacent to said first land, wherein a positive angle is formed between a first plane defined by a surface of said first land and said second plane, and a negative angle is formed between a third plane defined by a surface of said second land and said second plane.

6. The conductive element according to claim 4 wherein said land surfaces of each of said plurality of lands has said angle having the same degree as each of the other of said plurality of lands.

7. The conductive element according to claim 4 wherein at least one of said land surfaces of said plurality of lands has said angle having a different degree, than one or more of the other land surfaces of said plurality of lands.

8. The conductive element according to claim 1 wherein said electrically conductive separator plate is constructed of a material selected from the group consisting of: metals, metal alloys, polymer composites, and mixtures thereof.

9. The conductive element according to claim 1 wherein said land surface corresponding to said angle greater than zero of said electrically conductive separator plate is compressed against a compliant element in a fuel cell comprising a plurality of components, and induces a relatively greater contact pressure between said plurality of components of the compliant layer, when compared to a comparative contact pressure induced by a comparative plate having a land surface with an angle equal to zero compressed against said compliant element.

10. An assembly for an electrochemical cell comprising:
- a separator plate having an upper boundary and a lower boundary, said upper boundary comprising one or more lands formed therein, wherein at least one of said lands has an angled planar surface which defines a first plane and said lower boundary defines a second plane, wherein said first plane intersects said second plane at an angle greater than zero to define a land angle of said angled planar surface of said at least one land of greater than zero; and
- a compliant layer having a major surface adjacent to and in contact with said angled planar surface of said separator plate upper boundary.

11. The assembly according to claim 10 wherein said one or more lands comprise a plurality of lands that are formed in said upper boundary and interspersed therebetween are a plurality of grooves, said plurality of lands and grooves forming a fluid flow field.

12. The assembly according to claim 11 wherein said lands of said plurality have said angled surface having the same angle as each of the other of said plurality of lands.

13. The assembly according to claim 11 wherein one or more of said lands of said plurality have an angled surface having said angle with a different degree than one or more of the other of said plurality of lands.

14. The assembly according to claim 10 wherein said angle is greater than 0° and less than or equal 45°.

15. The assembly according to claim 10 wherein said angle is between 1° and 15°.

16. The assembly according to claim 10 wherein a first land of said one or more lands has an angled surface having a first angle which is positive with respect to said second plane and a second land of said one or more lands adjacent to said first land has an angled surface having a second angle which is negative with respect to said second plane.

17. The assembly according to claim 10 wherein under a compressive force, said major surface of said compliant layer conforms to said angled surfaces of said plurality of lands to form contact regions.

18. The assembly according to claim 17 wherein said contact regions form an electrically conductive path between said compliant layer and said separator plate.

19. The assembly according to claim 17 wherein under a compressive force, said compliant layer comprises a plurality of span regions corresponding to said grooves of said separator plate, wherein said span regions are interspersed between said contact regions.

20. The assembly according to claim 19 wherein said span regions of said compliant layer have a compression pressure greater than about 70 kPa under said compressive force.

21. The assembly according to claim 19 wherein said span regions of said compliant layer have a compression pressure of between about 70 kPa and 170 kPa under said compressive force.

22. The assembly according to claim 10 wherein said compliant layer comprises one or more fluid distribution media layers.

23. The assembly according to claim 10 wherein said compliant layer comprises a membrane electrode assembly.

24. The assembly according to claim 10 wherein said electrically conductive separator plate is constructed of a material selected from the group consisting of: metals, metal alloys, polymer composites, and mixtures thereof.

* * * * *